United States Patent
Tanaka et al.

[11] 3,833,915
[45] Sept. 3, 1974

[54] ELECTRONIC SHUTTER APPARATUS FOR CAMERA

[75] Inventors: Harumi Tanaka, Kobe; Akira Yoshizaki, Osaka, both of Japan

[73] Assignee: Minolta Camera Kabushiki Kaisha, Osaka, Japan

[22] Filed: Oct. 12, 1973

[21] Appl. No.: 405,990

[30] Foreign Application Priority Data
Oct. 28, 1972 Japan.............................. 47-108240

[52] U.S. Cl..................... 354/258, 354/50, 354/53, 354/246, 354/251, 354/267
[51] Int. Cl........ G03b 9/16, G03b 9/40, G03b 9/62
[58] Field of Search .......... 354/226, 245, 246, 256, 354/258, 266, 267, 50, 51, 53

[56] References Cited
UNITED STATES PATENTS

| | | | |
|---|---|---|---|
| 3,191,511 | 6/1965 | Burganella et al.............. | 95/10 CT |
| 3,205,797 | 9/1965 | Land et al. ..................... | 95/10 CT |
| 3,208,365 | 9/1965 | Cooper, Jr. et al.............. | 95/10 CT |
| 3,362,311 | 1/1968 | Singer............................. | 95/10 CT |
| 3,437,027 | 4/1969 | Straub............................ | 95/10 CT |
| 3,650,193 | 3/1972 | Shiminu......................... | 354/258 X |

Primary Examiner—Joseph F. Peters, Jr.
Attorney, Agent, or Firm—Wolder & Gross

[57] ABSTRACT

An apparatus including a release member operable by shutter release action to shift an electromagnet and a shutter opening and closing initiating member supporting an attraction piece at its one end. While the shutter is in its cocked state, the release member holds the electromagnet pressed against the attraction piece. Energization of the electromagnet causes the shutter opening and closing initiating member to operate with the release member to initiate shutter opening action and, when the electromagnet is deenergized, the shutter opening and closing initiating member permits the shutter to close. The apparatus further includes means for detecting energization or unenergization of the electromagnet and visually indicating in the finder field that the camera is not ready for taking a photograph when the electromagnet is unenergized. At the almost final stage of travel of a shutter blind, the means further brakes the blind to prevent the blind from bouncing when the blind stops.

10 Claims, 19 Drawing Figures

ELECTRONIC SHUTTER APPARATUS FOR CAMERA

BACKGROUND OF THE INVENTION

The present invention relates to an electronic shutter apparatus for cameras including an electromagnet to be energized for a period of time controlled by an exposure time control electric circuit so that the shutter is closed by deenergization of the electromagnet.

In conventional electronic shutter apparatuses of the type described, the electromagnet is supported by a member fixedly attached to the camera body and, when energized, the electromagnet attracts an attraction piece supported at a position away from the magnetic attracting surface of the electromagnet. The attraction piece is supported on a movable member, which prevents shutter closing action while the attraction piece is held attracted to the electromagnet. When the electromagnet is deenergized, the tension acting on the movable member retracts the attraction piece from the electromagnet, initiating the shutter into closing action.

With the conventional electronic shutter apparatus, therefore, the electromagnet must have a magnetic force sufficient to attract the attraction piece to the attracting surface against the tension on the movable member instantaneously when the electromagnet is energized, this entailing the drawback that the power source battery will be consumed markedly. Furthermore the space provided between the electromagnet and the attracting piece influences the attracting ability greatly, resulting in a delay in the attracting operation to impair the reliability of operation.

If the attraction piece is attached directly to a member for effecting shutter opening and closing action, residual magnetism will cause malfunction of members in the neighborhood. Use of an electromagnet giving an excess magnetic force therefore involves problems. For this reason the attraction piece is provided on a member for preventing certain movement of the member which effects shutter opening and closing action so as to initiate the shutter into closing action indirectly upon deenergization of the electromagnet. However, this renders the shutter operating mechanism complex and large.

On the other hand, compact cameras of a simple construction may incorporate therein a battery checker for checking drain of the power source battery, but such device involves problems in respect of space for installation and cost. Furthermore provision of means for preventing bouncing of the shutter blind at the final position of its travel to improve accuracy of exposure also entails problems with respect to installation space and cost and renders the camera mechanism complex.

SUMMARY OF THE INVENTION

An object of this invention is to provide an electronic shutter apparatus of the type described in which the electromagnet is energized with a minimum current and yet the attraction piece can be held attracted to the electromagnet reliably so as to render the power source battery serviceable over a greatly prolonged period of time.

Another object of this invention is to simplify the construction of the apparatus to the greatest possible extent and to improve the reliability of its operation.

Another object of this invention is to provide an inexpensive electronic shutter apparatus especially suitable for compact cameras of a simple construction.

Another object of this invention is to provide an apparatus including means for warning that the shutter is not ready for a normal photographing operation upon detecting drain of the power source battery through the operation of the electromagnet.

Still another object of this invention is to provide a mechanism for preventing the shutter blind from bouncing at the final position of its travel by utilizing the warning means.

The apparatus of this invention includes an electromagnet to be energized for a period of time controlled by an exposure time control electric circuit and an attraction piece to be held attracted by the magnet when it is energized. One of these elements is supported by a release member operable by shutter tripping action and the other element is supported by a shutter opening and closing initiating member to be operated by shutter tripping action to open and close the shutter blinds. Normally, the attraction piece is mechanically held attracted to the attracting surface of the electromagnet.

The electromagnet is first energized by shutter tripping action and magnetically attracts the attraction piece which has been pressed against its attracting surface mechanically. Inasmuch as the space through which the attraction piece is drawn by the attracting action is nill, the attracting action takes place without any delay and a minimum energizing current assures reliable attraction. It is well-known that the magnetic force of electromagnet is in inverse proportion to the square of the distance between the electromagnet and a member to be thereby attracted, namely to the square of the distance between the above-mentioned attraction piece and the attracting surface of the electromagnet. Since the above-mentioned space is zero according to this invention, the electromagnet acts most effectively when energized and there is no need to adapt the electromagnet for a particularly great current.

When the shutter is tripped, the release member and the shutter opening and closing initiating member operate together against the tension acting on the shutter opening and closing member, by virtue of energization of the electromagnet and through the electromagnet and the attraction piece. Through this operation, the opening and closing initiating member brings the shutter into opening action and prevents shutter closing action.

Upon lapse of a time counted by the exposure time control electric circuit, the electromagnet is deenergized, whereupon the tension acting on the opening and closing initiating member moves the initiating member in the direction to retract the attraction piece from the electromagnet, permitting the shutter to start to close.

According to this invention, the shutter opening and closing initiating member is operatively associated with the release member through the electromagnet and attraction piece, the opening and closing initiating member being so disposed as to directly effect shutter opening and closing action, so that the number of constituent parts of the electronic shutter apparatus can be reduced a great deal to render the construction simple, compact and most suitable especially for compact cameras of a simple consruction.

If the power source battery has been drained in the electronic shutter apparatus described, the electromagnet would fail, when the shutter is tripped, to exert on the attraction piece a magnetic force sufficient to operate the shutter opening and closing initiating member against the tension acting thereon. Consequently, the operation of the release member would produce a space between the electromagnet and the attraction piece, leaving the shutter out of operation and making it impossible to take a photograph.

According to this invention, a detecting element is brought into the space produced between the electromagnet and the attraction piece under the above-mentioned situation to detect the drain of the power source battery, and there is provided means for visually indicating in the finder field that the shutter is not in condition for taking a photograph. This means includes means for mechanically preventing the above operation in operative relation to the travel of shutter blind if the shutter blind travels. Accordingly, when the shutter is in normal state for taking photographs, the indicating means will not be positioned within the finder field.

The indicating means of this invention is further so disposed that part of the means will come into contact with the shutter blind at the final stage of travel of the shutter blind. Through the contact thus effected, the shutter blind is braked by the tension action on the indicating means. In this way, the shutter blade is braked by the indicating means at the final stage of its travel and is thereby prevented from bouncing when coming to a halt to assure an accurate exposure making operation.

Other objects and features of this invention will become more apparent from some embodiments of the invention described below.

DESCRIPTION OF THE PREFERRED EMBODIMENTS

Figure 1:
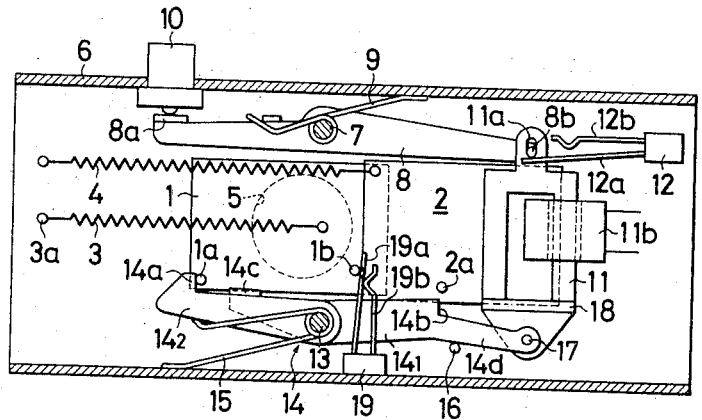
FIG. 1 is a front view illustrating an embodiment of the present invention as the shutter is in its cocked state.
Figure 2:
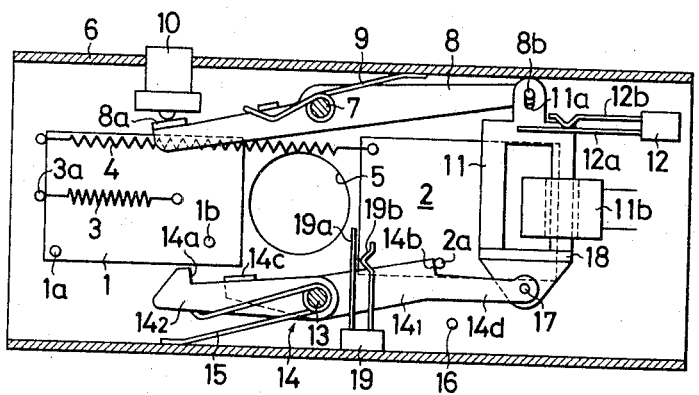
FIG. 2 is a front view showing the same after the first shutter blind has completed its travel.
Figure 3:
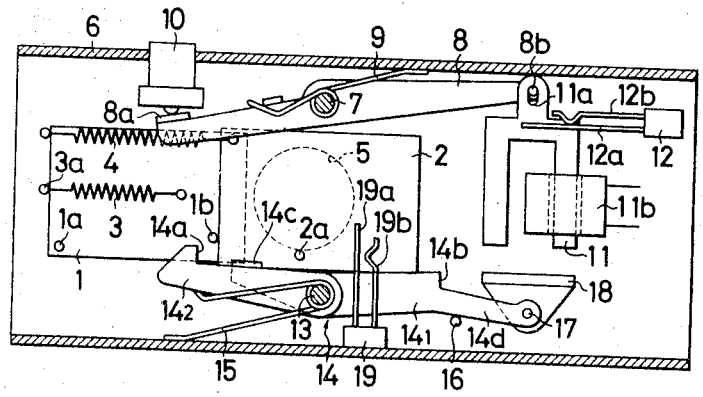
FIG. 3 is a front view showing the same after the second shutter blind has completed its travel.

FIGS. 1 to 3 show an embodiment of the shutter device of this invention wherein the first blind 1 and second blind 2 of the shutter are adapted to be driven in one direction to make an exposure by springs 3 and 4 under the control of count action of an unillustrated known exposure time control electric circuit to be energized by a shutter tripping action. While the shutter is in its cocked position as illustrated in FIG. 1, a shutter aperture 5 is kept closed by the first blind 1, with the second blind 2 retained in its cocked position at the right side of the aperture 5. The first blind 1 and second blind 2 are supported on a base plate 6 and are slidable rightward and leftward.

A release member 8 pivoted in the form of a balance to a pin 7 on the base plate 6 and urged by a spring 9 in a clockwise direction has a driven end 8a which pushes up a shutter button 10 and exposes the button 9 from the upper surface of the camera body 6.

A pin 8b projecting from the other end of the release member 8 engages in a vertical slot 11a formed in the upper end of an electromagnet 11 and pushes the electromagnet 11 downward. The end of the pin 8b also depresses the movable contact member 12a of power source switch 12 of the exposure time control electric circuit, out of contact with a stationary contact member 12b to leave the switch 12 open. When freed from the depression, the movable contact member 12a of course moves upward into contact with the stationary contact member 12b due to its own elasticity to close the switch 12, whereupon current flows through the winding 11b of the electromagnet 11 to energize the magnet.

A shutter opening and closing initiating member 14 pivoted to another pin 13 on the base plate 6 comprises a member $14_1$ pivoted to the pin 13 and a hooked member $14_2$ pivoted at its base portion to the same pin 13 and urged clockwise by a spring 15 into engagement with a bent portion 14c at the rear end of the member $14_1$, the spring 15 thus acting on the member $14_1$ to engage the same with a stopper 16 in its cocked position.

The member $14_1$ has a front end 14d to which pivoted by a pin 17 is an attraction piece 18 opposing the attracting surface of the electromagnet 11. The spring action on the release member 8 presses the attracting surface of the electromagnet 11 against the attraction piece 18.

The hooked member $14_2$ has a hook 14a in engagement with a pin 1a on the first blind 1 having its spring 3 tensioned in its cocked position, whereby the first blind 1 is retained in its cocked position.

The second blind 2 is in engagement with another pin $1b$ on the first blind 1 and is thereby retained in its cocked position, with the spring 4 in tensioned state. The second blind 2 in its cocked position has a pin $2a$ so positioned as to be engageable with a stepped portion $14b$ formed in the member $14_1$ when the member $14_1$ turns in a counterclockwise direction. The pin $1b$ on the first blind 1 in its cocked position is in pushing contact with the movable contact member $19a$ of count switch 19 of the exposure time control electric circuit to contact the member $19a$ with a stationary contact member $19b$ and to thereby close the switch 19. When freed from the pressure, the movable contact member $19a$ moves out of contact with the stationary contact member $19b$ by virtue of its own elasticity to open the switch 19.

While the shutter is in its cocked state as illustrated in FIG. 1, depression of the shutter button 10 turns the release member 8 in a counterclockwise direction against the spring 9 and moves the pin $8b$ upward within the vertical slot $11a$ of the electromagnet 11, freeing the movable contact member $12a$ of the power source switch 12 from pressure to close the switch 12, whereupon current flows through the winding $11b$ to energize the electromagnet 11, which in turn exerts a magnetic force on the attraction piece 18 pressed against its attracting surface and holds the attraction piece 18 attracted.

Upon the pin $8b$ reaching the upper end of the vertical slot $11a$, the pin $8b$ moves further upward with the electromagnet 11 due to the continuous clockwise turning of the release member 8, permitting the attraction piece 18 held attracted to the electromagnet 11 to turn the shutter opening and closing initiating member 14 in a counterclockwise direction against the spring 15.

Since the bent portion $14c$ of the member $14_1$ is in engagement with the upper edge of the member $14_2$, the member 14 turns in the counterclockwise direction free of trouble and disengages the pin $1a$ on the first blind 1 from the hook $14a$. Thus the counterclockwise turning of the initiating member 14 releases the first shutter blind 1 from its cocked position into rapid leftward travel under the action of the spring 3. The first blind 1 stops upon striking against a stopper $3a$ supporting the fixed end of the spring 3, whereby the shutter is opened out.

Immediately before or the moment when the first blind 1 is freed from its cocked position, the counterclockwise turning of the initiating member 14 brings the stepped portion $14b$ of the member $14_1$ into engagement with the pin $2a$ on the second shutter blind 2. In spite of disengagement of the second blind 2 from the pin $1b$ on the first blind 1, therefore, the engagement of the stepped portion $14b$ with the pin $2a$ still retains the second blind 2 in its cocked position.

Simultaneously with the initiation of leftward travel of the first blind 1, th pin $1b$ on the first blind 1 frees the movable contact member $19a$ of the count switch 19 from the pressure and opens the switch 19.

In this way the parts shift from the positions in FIG. 1 to the positions in FIG. 2 to open the shutter to a full aperture.

As well known, the opening of the count switch 19, the moment when it is effected, initiates the exposure time control electric circuit into a counting action for controlling the exposure time.

Upon lapse of time counted by the exposure time control circuit, the current for energizing the winding $11b$ is turned off to deenergize the electromagnet 11 and the attraction piece 18 is relieved of the attracting force. Accordingly, the shutter opening and closing initiating member 14 is turned, along with the attraction piece 18, in a clockwise direction by the spring 15 acting thereon, releasing the stepped portion $14b$ from engagement with the pin $2a$ on the second blind 2. Consequently, the second blind 2 is released from its cocked position and travels leftward rapidly under the action of the spring 4 to close the shutter aperture 5. The second blind comes into contact with the pin $1b$ and completes its leftward travel. The clockwise turning of the shutter opening and closing initiating member 14 is stopped by the contact of the member $14_1$ with the stopper 16. Thus the parts are brought to the positions shown in FIG. 3 to complete shutter opening and closing action, namely exposure making operation.

When the shutter button 10 is freed from the depressing force upon completion of exposure, the spring 9 turns the release member 8 in a clockwise direction and pushes up the shutter button 10, moving the electromagnet 11 downward to bring the attracting surface into contact with the attraction piece 18. Th pin $8b$ contacts the lower end of the vertical slot $11a$ and presses the electromagnet 11 against the attraction piece 18 under the action of the spring 9. The pin $8b$ also pushes down the movable contact member $12a$ of the power source switch 12 to open the switch 12, whereupon the member 8 completes its clockwise movement. By way of the member $14_1$, attraction piece 18 and electromagnet 11, the stopper 16 serves to determine the position where the release member 8 stops during its clockwise turning. The length of the vertical slot $11a$ is so determined that during the shutter tripping action described the power source switch 12 will be opened before the counterclockwise turning of the release member 8 starts to open the shutter. This makes it sure that the current will be supplied to the winding $11b$ of the electromagnet 11 while the attraction piece 18 is in intimate contact with the electromagnet 11, eliminating a delayed operation when the magnet is energized.

For the subsequent photographing operation, the shutter is cocked by unillustrated means. More specifically, an unillustrated member drives the first blind 1 rightward in engagement therewith while tensioning the spring 3. The second blind 2 is also driven rightward while tensioning the spring 4 by being pushed by the pin $1b$ on the first blind 1. Thus the pin $1b$ serves to drive the first blind 1 and the second blind 2 together rightward, with their ends overlapping each other, permitting the springs 3 and 4 to be tensioned. Slightly before the cocking operation is completed, the pin $1a$ strikes against the slanting edge of the hook $14a$ of the hooked member $14_2$ and passes over the hook $14a$ while turning the member $14_2$ counterclockwise against the spring 15. The pin reaches the cocked position. Upon completion of the passing-over movement, the member $14_2$ turns in a clockwise direction under the action of the spring 15, causing the hook $14a$ to engage with the pin $1a$ and to thereby latch the first blind at its cocked position. The second blind 2 is retained at its cocked position by the first blind 1 with the pin $1b$. In this way, the parts are retained in the cocked state shown in FIG. 1 and cocking operation is completed.

Since the first and second blinds 1 and 2 travel rightward at the same time in overlapping relation to each other as already described, the shutter cocking operation is effected free of any trouble such as opening of the shutter aperture 5. Further the shutter opening and closing initating member 14 in the illustrated embodiment comprises two members $14_1$ and $14_2$, such that when the pin 1a passes over the hook 14a during the shutter cocking operation, the member $14_2$ alone turns counterclockwise and then returns. According to this construction, the interfering action of the pin 1a on the initating member 14 during the shutter cocking operation can be absorbed only by the member $14_2$. The initiating member 14 comprising the two divided members $14_1$ and $14_2$ may alternatively be in the form of one integral member.

Figure 4:
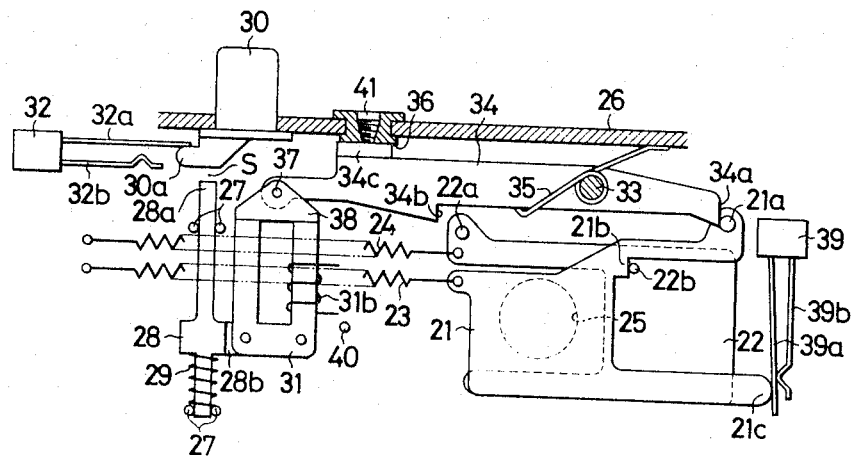
FIG. 4 is a front view showing another embodiment of the present invention as the shutter is in its cocked state.
Figure 5:
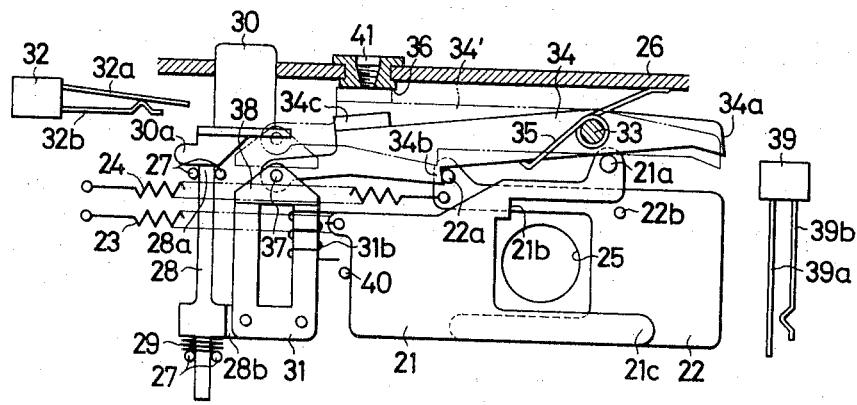
FIG. 5 is a similar view showing the same after the first shutter blind has completed its travel.

FIGS. 4 and 5 show an embodiment in which a shutter button 30 biased upward by an unillustrated spring directly operates the power source switch 32 of an exposure time control electric circuit. Between the button 30 and the upper end 28a of a release member 28 there is provided a suitable space S for preventing the travel of a first shutter blind 21 before the power source switch 32 is closed. The release member 28 is supported by upper and lower pairs of guide members 27 in an upwardly and downwardly movable manner and is urged upward by a spring 29.

FIG. 4 shows the shutter in its cocked state in which the shutter button 30, by virtue of its upward spring force, pushes up the movable contact member 32a of the power source switch 32 with its arm 30a to keep the switch open.

Depression of the shutter button 30 moves down the movable contact member 32a into contact with a stationary contact member 32b to close the power source switch 32. Consequently, current flows through the winding 31b of an electromagnet 31 and energizes the magnet, which in turn exerts a magnetic force on an attraction piece 38 which has been in mechanical pressing contact with the attracting surface of the magnet and holds the same attracted thereto.

Further depression of the shutter button 30 eliminates the space S between the lower surface of the button and the upper end 28a of the release member 28 and pushes down the release member 28 along the guide members 27, against the upwardly biasing spring 29.

Since the release member 28 fixedly carries on its arm 28b the electromagnet 31 which is holding the attraction piece 38 pivoted by a pin 37 to the end of a shutter opening and closing initiating member 34, the opening and closing initiating member 34 turns in a counterclockwise direction in operative relation to the downward movement of the release member 28 through the electromagnet 31 and attraction piece 38.

The opening and closing initiating member 34 is pivoted to a pin 33 on a base plate 26 in the form of a balance and is urged by a spring 35 in a clockwise direction, with its latch end 34a in engagement with a pin 21a on the first shutter blind 21 to retain the blind 21 in its cocked position. The above-mentioned counterclockwise turning frees the first blind 21 from the cocked position.

When in cocked state, the first blind 21, urged leftward by a spring 23, is retained in the above-mentioned position with its latch edge 21b in engagement with a pin 22b on a second shutter blind 22 to retain the blind 22 in its cocked position. The movable contact member 39a of a count switch 39 included in an exposure time control electric circuit is pushed by the rear end 21c of the first blind into contact with a stationary contact member 39b to close the switch 39. When freed from the cocked position as described above, the first blind slides leftward rapidly to open a shutter aperture 25 and stops upon striking against the stopper 40. Further simultaneously with the initiation of the sliding travel, the first blind 21 frees the second blind 22 from engagement therewith at its cocked position and also removes pressure from the movable contact member 39a of the count switch 39, whereupon the count switch 39 opens, initiating the exposure time control electric circuit into counting action.

The second blind 22 disengaged from the first blind 21 at its cocked position tends to travel leftward under the action of its spring 24 but, immediately before or at the moment of the disengagement, the stepped portion 34b of the opening and closing initiating member 34, turned counterclockwise by shutter tripping action, advances to the path of travel of a pin 22a on the blind 22 when the second blind 22 travels leftward and engages with the pin 22a to prevent the leftward travel of the blind 22 and to thereby keep the shutter aperture 25 open. Thus the parts are brought to the positions indicated in the solid line in FIG. 5. As in FIG. 1, the first and second blinds 21 and 22 are supported on the base plate 26 so as to be slidable leftward and rightward.

Upon lapse of the time counted by the exposure time control electric circuit, the current flowing through the winding 31b of the electromagnet 31 is turned off to deenergize the electromagnet 31. Accordingly, as indicated in the phantom line 34' in FIG. 5, the shutter opening and closing initiating member 34 turns clockwise with the attraction piece 38 under the action of the spring 35, releasing the pin 22a from the stepped portion 34b. The second blind 22 therefore travels leftward rapidly under the action of the spring 24 and closes the shutter aperture 25 and then stops upon the pin 22b striking against the latch edge 21b of the first blind 21 to complete an exposure.

When the shutter button 30 is relieved of the pressure, the button 30 moves upward, causing its arm 30a to open the power source switch 32. Following this movement, the release member 28 also moves upward under the action of the spring 29 and presses the attracting surface of the electromagnet 31 fixed thereto against the attraction piece 38 in the phantom-line position of FIG. 5. In this state, the space S is formed between the shutter button 30 and the upper end 28a of the release member 28.

By virtue of the clockwise turning of the shutter opening and closing initiating member 34 for releasing the second blind 22, the bent portion 34c of the member 34 bears against the under surface of a stopper 36 fixed to the camera body 26. By way of the member 34, attraction piece 38 and electromagnet 31, the stopper 36 therefore serves also as a stopper for the upward movement of the release member 28 to maintain the space S.

As in FIG. 1, an unillustrated member moves the first blind 21 rightward to cock the shutter. By means of the pin 22b, the second blind 22 is also driven with the first blind and the springs 23 and 24 are tensioned. In nearly the same manner as in FIG. 1, the pin 21a on the first blind 21 passes over the latch end 34a of the shutter opening and closing initiating member 34 at the almost final stage of the cocking action and is engaged by the latch end 34a, whereby the first blind 21 is latched in its cocked position by the shutter opening and closing initiating member 34. At the same time, the rear end 21c pushes the movable contact member 39a of the count switch 39 and closes the switch 39.

Inasmuch as the shutter opening and closing initiating member 34 is made of an integral member, the stepped portion 34b will come into the path of movement of the pin 22a due to the counterclockwise turning of the member 34 when the pin 21a passes over the latch end 34a during the rightward movement of the pins 21a and 22a effected by the cocking operation. If at this time the pin 22a has already moved rightward past the path of movement of the stepped portion 34b, the contact of the pin 22a with the member 34 to turn the same clockwise will not take place which would interfere with the turning of the member 34 by the pin 21a in the opposite direction, with the result that the pin 21a can pass over the latch end 34a to assure smooth cocking operation. For this purpose, there is provided a small space between the stepped portion 34b and the pin 22a when the parts are in cocked positions.

The embodiment shown in FIGS. 1 to 3 does not have such space since the above-mentioned objection is overcome by employing the shutter opening and closing initiating member which is in the form of a double bar.

The second blind 22 driven with the first blind 21 by its pin 22b being pushed by the stepped portion 21b of the first blind 21 is retained by the first blind 21 in its cocked position of FIG. 4 when the first blind 21 is latched as above.

The stopper 36 is threaded therethrough as at 41 for mounting an operation member (not shown) for bulb photography. When a bulb exposure is made with the operation member mounted in the threaded hole 41, the bent portion 34c of the shutter opening and closing initiating member 34 will be depressed by the operation member. The member 34 therefore turns in a counterclockwise direction, freeing the first blind 21 from its cocked position while retaining the second blind 22 in its cocked position to open out the shutter aperture 25.

When the opening and closing initiating member 34 is relieved of the pressure by the operation member, the spring 35 acts to turn the member 34 in a clockwise direction, freeing the second blind 22 from its cocked position to close the aperture 25 and complete the exposure.

The exposure time control electric circuit need not be energized for the bulb exposure. Accordingly, this embodiment is so constructed that while the power source switch 32 is left open the operation member for bulb exposure directly operates the shutter opening and closing member 34. Alternatively, the bulb exposure operation member, namely the mounting for the operation member, need not be provided, but the shutter button 30 may then be supported on the camera body 26 in slidable fashion. The button 30 is slidingly displaced from the illustrated position and the member 34 is directly operated by the shutter button 30 to make a bulb exposure.

Figure 6A:
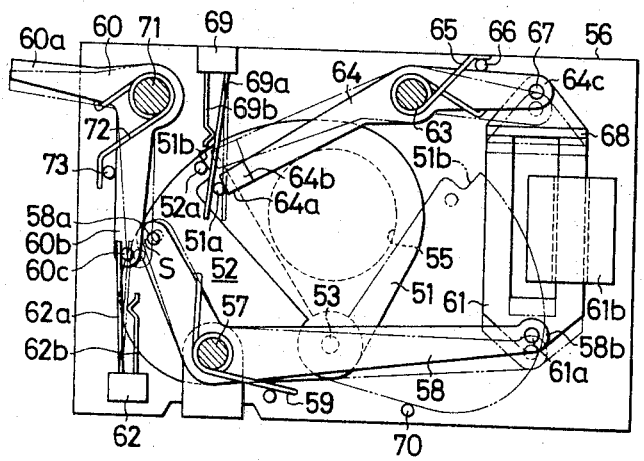
FIG. 6a is a front view showing another embodiment of the present invention.

The embodiment shown in FIGS. 6a and b is of such type that first shutter blind 51 and second shutter blind 52 turn in one direction to open and close the shutter.

The first blind 51 and second blind 52 are pivoted to a pin 53 on a shutter base plate 56 and urged in a clockwise direction by unillustrated springs when retained in cocked state. A release member comprises a first release member 60 having a driven portion 60a opposing an unillustrated shutter button and a second release member 58 disposed in operative relation to the member 60 and carrying at its rear end 58b an electromagnet 61 pivoted thereto by a pin 61a.

When the unillustrated shutter button is depressed while the shutter is in cocked state as indicated in solid lines in FIG. 6a, the first release member 60 pivoted to the pin 71 and urged by a spring 72 in a clockwise direction into contact with a stopper 73 turns in a counterclockwise direction by being pushed at its driven portion 60a.

A power source switch 62 which has been open with its movable contact member 62a pushed by a pin 60c of the first release member 60 is closed when the movable contact member 62a is freed from the pressure and comes into contact, with its own elasticity, with a stationary contact member 62b by virtue of the counterclockwise turning of the first release member 60. Consequently, current flows through the winding 61b of the electromagnet 61. An attraction piece 68 which has been pressed by the electromagnet 61 is therefore held attracted to the magnet.

Between an arm 60b of the first release member 60 and a pin 58a on the second release member 58, there is provided a space S corresponding to the space S of the embodiment of FIG. 4, so that the first release member 60 turned as above will not push the second release member 58 to shift the electromagnet 61 before the first release member 60 closes the power source switch 62.

After closing the power source switch 62, the first release member 60 further turns counterclockwise to bring its arm 60b into contact with the pin 58a on the second release member 58 and pushes the member 58.

The second release member 58, pivoted to a pin 57 and urged by a spring 59 in a counterclockwise direction, pivotally carries at its rear end 58b the electromagnet 61 in pressing contact with the attraction piece 68. The first release member 60 pushing the pin 58a turns the second release member 58 in a clockwise direction to move the electromagnet 61 downward. Since the electromagnet 61 has already been energized to hold the attraction piece 68 attracted at this time, the electromagnet moves down as above along with the attraction piece 68, turning the shutter opening and closing initiating member 64 in a clockwise direction which member pivotally carries, with a pin 67, the attraction piece 68 at its rear end 64.

The shutter opening and closing initiating member 64, pivoted to a pin 63 and urged by a spring 65 in a counterclockwise direction, bears against a stopper 66 when the shutter is in cocked state and has a front end in engagement with a pin 51a on the first shutter blade 51 to retain the first blind 51 in its cocked position. The first blind 51 is in engagement, at its rear edge 51b, with a pin 52a on the second blind 52 to latch the second blind 52 at its cocked position. The pin 52a on the second blind 52 is positioned outwardly of the path of turning of the pin 51a on the first blind 51.

The clockwise turning of the shutter opening and closing initiating member 64 described above disengages the front end 64a from the pin 51a, freeing the first blind 51 from its cocked position and positions the front end 64a into the path of advance of the pin 52a on the second blind 52.

This permits the front blind 51 to rapidly turn clockwise about the pin 53 under the action of an unillustrated spring to open a shutter aperture 55 for initiation of exposure. Further simultaneously with the initiation of the clockwise turning, the first blind 51 removes the pressure of the pin 51a from movable contact member 69a of a count switch 69, permitting the movable contact member 69a to move out of contact with the stationary contact member 69b due to its own elasticity to open the count switch 69, whereupon an exposure time control electric circuit starts counting.

On the other hand, the second blind 52 tends to turn clockwise under the action of an unillustrated spring, following the clockwise turning of the first blind 51, but since the front end 64a of the member 64 is brought into the path of advance of the pin 52a on the second blind 52 upon disengagement of the shutter opening and closing initiating member 64 from the first blind 51, the pin 52a comes into engagement with the end 64a, whereby the second blind 52 is still retained in its cocked position. Thus the parts are brought to the phantom-line position in FIG. 6a to make an exposure.

Upon lapse of time counted by the exposure time control electric circuit, the electromagnet is deenergized to free the attraction piece 68 from attraction, permitting the shutter opening and closing initiating member 64 to turn in a counterclockwise direction under the action of the spring 65 to release the pin 52a from its front end 64a. The second blind 52 is therefore freed from its cocked position and turns clockwise rapidly under the spring force acting thereon to close a shutter aperture 55 for completion of exposure. The stopper 66 prevents the counterclockwise turning of the shutter opening and closing initiating member 64.

When the pressure on the shutter button is removed upon completion of exposure, the spring 72 acts to return the first release member 60 in a clockwise direction. The member 60 opens the power source switch 62 and stops by bearing contact with the stopper 73. The second release member 58 turns in a counterclockwise direction under the action of the spring 59 following that movement and raises the electromagnet 61 to press its attracting surface against the attraction piece 68, whereupon the second release member 58 completes its counterclockwise turning. The space S is formed between the pin 58a and the arm 60b of the first release member 60.

A stopper 70 stops the first blind when the shutter is opened out.

An unillustrated cocking member is operated to turn the first blind 51 counterclockwise while tensioning the spring action thereon. At the same time, the first blind pushes, with its rear edge 51b, the pin 52a on the second blind 52 to turn the second blind 52 together. In this way, the first blind 51 and the second blind 52 are turned together counterclockwise without opening the shutter aperture 55 during the shutter cocking action. Immediately before completion of the shutter cocking operation, the pin 51a pushes the movable contact member 69a of the count switch 69 and closes the switch.

Figure 6B:
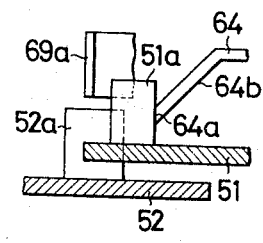
FIG. 6b is a fragmentary side elevation showing the same in vertical section.

The counterclockwise turning of the first blind 51 during the shutter cocking operation brings the pin 51a into contact with the under edge of the shutter opening and closing initiating member 64 in the solid-line position of FIG. 6a and pushes the member 64 in a clockwise direction against the spring 65 to remove the member 64 from the path of advance of the pin 51a. Accordingly, the pin 52a positioned outwardly of the path of turning of the pin 51a will turn counterclockwise behind the member 64 and will be prevented from turning by the front end 64a. However, since the front end of the member 64 is bent to provide a slanting portion 64b as illustrated in FIG. 6b, the pin 52a passes in the counterclockwise direction while pushing up the slanting portion 64b. Upon reaching an overcocked position, the spring 65 returns the member 64 to the solid-line position, bringing the end 64a into the path of clockwise advance of the pin 51a, and the end 64a engages with the pin 51a to latch the first blind 51 and second blind 52 at cocked position to complete the cocking operation.

Figure 7:
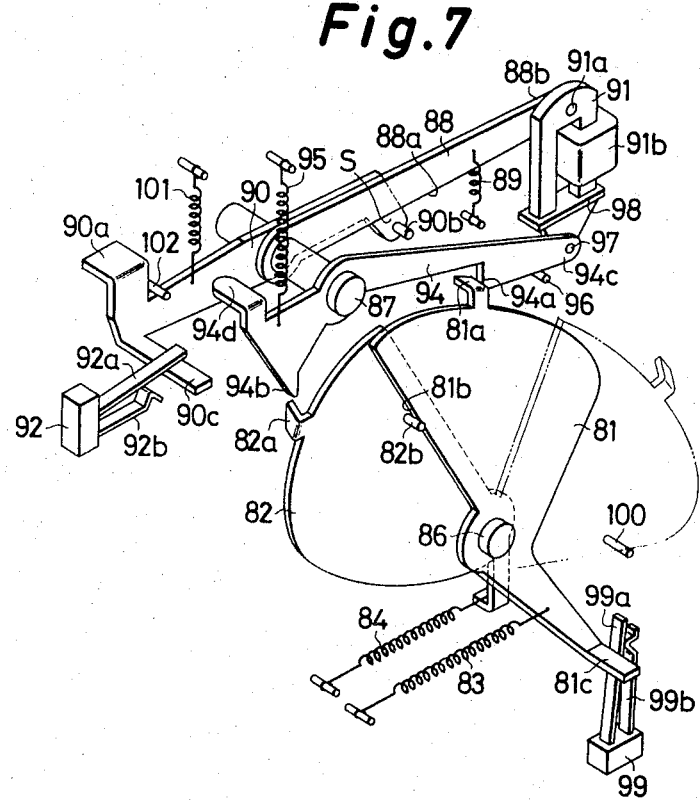
FIG. 7 is a perspective view showing another embodiment of this invention as the shutter is in its cocked state.

FIG. 7 shows an embodiment wherein a first release member 90, second release member 88 and shutter opening and closing initiating member 94 are supported by one pin 87.

While the shutter is in its cocked state indicated in the solid line in FIG. 7, the first release member 90, pivoted to the pin 87 and urged by a spring 101 clockwise into contact with the stopper 102, has an arm 90c pushing up a movable contact member 92a to leave the power source switch 92 open. An unillustrated shutter button, when depressed, pushes down an upper bent portion 90a to turn the member 90 in a counterclockwise direction.

This permits the movable contact member 92a to move down into contact with a stationary contact member 92b due to its own elasticity, following the movement of the arm 90c. The power source switch 92 therefore closes to supply current to the winding 91b of the electromagnet 91 whose attracting surface has been pressed against an attraction piece 98, whereby the electromagnet 91 holds the attraction piece 98 attracted thereto.

The first release member 90 is pivoted to the pin 87 in the form of a balance and has a pin 90b at its rear end. The second release member 88 is pivoted to the same pin 87 and is urged clockwise by a spring 89. When the shutter is in its cocked state, a space S is provided between the pin 90b and the under edge 88a of the member 88 to serve the same purpose as in FIG. 6. After the first release member 90 has closed the power source switch 92 by virtue of its counterclockwise turning, the pin 90b comes into contact with the ender edge 88a of the second release member 88 and turns the member 88 counterclockwise.

The second release member 88 has the electromagnet 91 which is pivoted to its end 88b by a pin 91a. Accordingly, the counterclockwise turning brings the electromagnet 91 upward. Since the electromagnet 91 has already been energized upon closing of the power source switch 92 and holds the attraction piece 98 attracted thereto, the upward movement of the magnet turns the shutter opening and closing initiating member 94 in a counterclockwise direction which member supports the attraction piece 98 at its end 94c by means of a pin 97.

The shutter opening and closing initiating member 94, pivoted to the same shaft 87 as the members 90 and 88 in the form of a balance, is urged by a spring 95 in a clockwise direction and bears against a stopper 96 when the shutter is in cocked state, the member 94 further having a stepped portion 94a in engagement with the lug 81a of a first shutter blind 81 to retain the first blind 81 in its cocked position.

The first blind 81 is pivoted to a pin 86 and is urged by a spring 83 in a clockwise direction. When in cocked position, the blind 81 pushes a pin 82b on a second blind 82 with its rear edge 81b to cock the second blind 82 in position and causes its arm 81c to push the movable contact member 99a of a count switch 99 into contact with a stationary contact member 99b to close the switch 99. The second blind 82 is pivoted to the same pin 86 as the first blind 81 and is urged by a spring 84 in a clockwise direction.

The counterclockwise turning of the shutter opening and closing initiating member 94 disengages the stepped portion 94a from the lug 81a of the first blind 81 to free the first blind 81 from its cocked position and brings a latch portion 94b formed at the rear end of the member 94 into the path of clockwise turning of a lug 82a formed on the second blind 82.

The first blind 81 freed from the engagement quickly turns in a clockwise direction under the action of the spring 83 to open a shutter aperture (not shown) for initiation of exposure and stops at the phantom-line position in the drawing upon contact with a stopper 100. Further simultaneously with the initiation of clockwise turning of the first blind 81, the arm 81c thereof moves out of pressing contact with the movable contact member 99a to open the count switch 99, initiating an exposure time control electric circuit into counting action.

Although the second blind 82 is disengaged at its cocked position from the first blind 81 by virtue of the clockwise turning of the first blind 81, the lug 82a comes into engagement with the latch end 94b of the shutter opening and closing initiating member 94 which latch end is now positioned in the path of counterclockwise movement of the lug 82a. Consequently, the second blind 82 still remains in its cocked position.

Upon lapse of time counted by the exposure time control electric circuit, the electromagnet 91 is deenergized, relieving the attraction piece 98 of the attracting force, so that the spring 95 forces the shutter opening and closing initiating member 94 toward a clockwise direction to release the second blind 82 from the latch end 94b. The member 94 strikes against the stopper 96 and stops. The released second blind 82 turns rapidly in a clockwise direction under the action of the spring 84 and closes the shutter aperture and stops when the pin 82b striking against the rear edge 81b of the first blind 81 in the phantom-line position to complete an exposure.

After exposure, the shutter button is relieved of the depressing force. The first release member 90 now turns in a clockwise direction under the action of the spring 101, causing its arm 90c to open the power source switch 92, and is stopped by contact with the stopper 102. At the same time, the spring 89 turns the second release member 88 clockwise and moves down the electromagnet 91 to mechanically press its attracting surface against the attraction piece 98, whereupon the member 88 stops. In this state, the aforementioned space S is formed between the under edge 88a of the second release member 88 and the pin 90b of the first release member 90.

The shutter is cocked in the same manner as in FIG. 6 by turning the first blind 81 in a counterclockwise direction. The second blind 82 is turned counterclockwise by the pin 82b being pushed by the rear edge 81b of the first blind 81 without opening the shutter aperture. At the almost final stage of cocking operation, the lug 81a of the first blind 81 comes into contact with the under edge of stepped portion 94a of the shutter opening and closing initiating member 84 and pushes up the member 84 to move past this portion in the same manner as the passing-over movement already described. Further the arm 81c closes the count switch 99, and upon completion of the cocking operation the lug 81a engages with the stepped portion 94a. In this way the parts are shifted to the cocked positions indicated in the solid line in FIG. 7.

The shutter opening and closing initiating member 94 further has a driven portion 94d for bulb exposures. When the driven portion 94d is depressed by an unillustrated operation member for bulb photography, the member 94 turns counterclockwise independently of the first release member 90, releasing the first blind 81 from its cocked position, and latches the second blind 82 at its cocked position to fully open the shutter. When relieved of the pressure of the operation member, the initiating member 94 turns clockwise under the action of the spring 95 and unlatches the second blind 82 to close the shutter and complete an exposure. In this case the power source switch 92 is left open and the exposure time is determined in accordance with the duration of depression of the member 94 by the bulb photography operation member.

Figure 8:
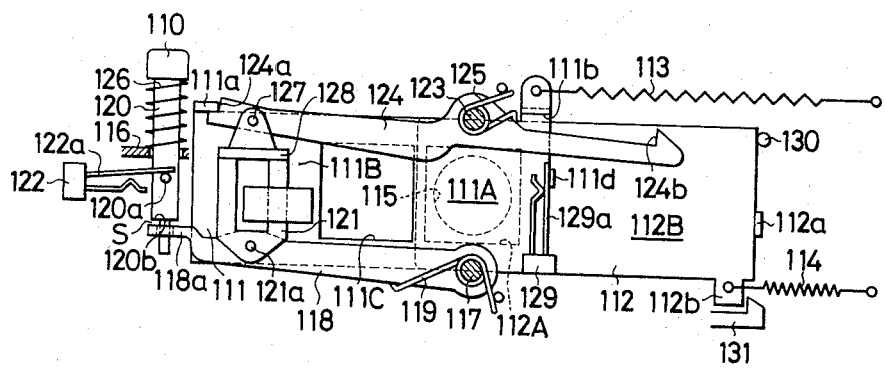
FIG. 8 is a front view showing another embodiment of the present invention as the shutter is in its cocked state.
Figure 9:
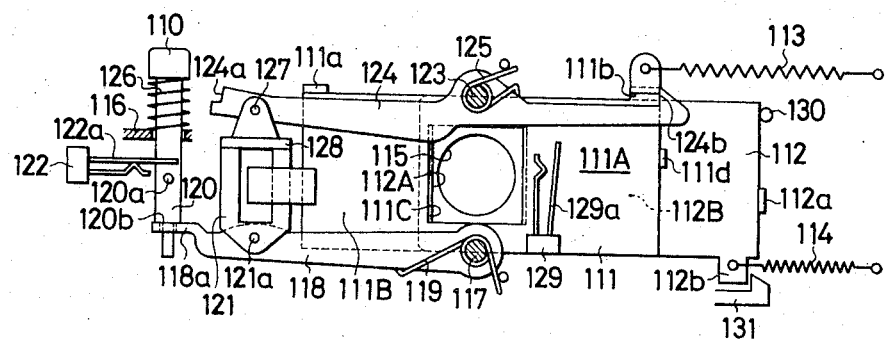
FIG. 9 is a similar view of the same after the first shutter blind has completed its travel.
Figure 10:
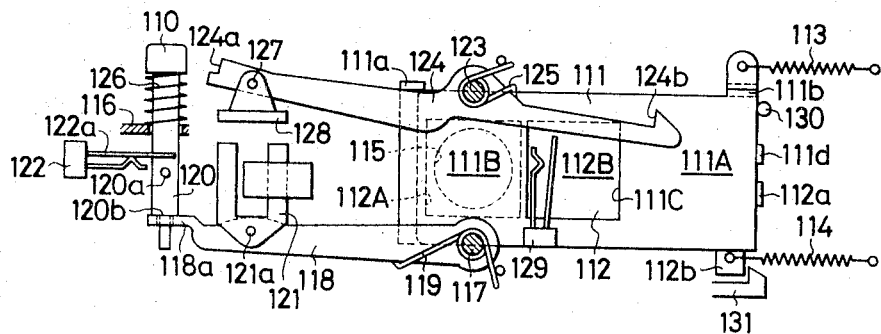
FIG. 10 is a similar view of the same after the second shutter blind has completed its travel.

The embodiment shown in FIGS. 8 to 11 is so designed that one shutter blind 111 is travelled in one direction to open and close the shutter. A shutter blind 111 and a cocking blind 112, supported on a base plate (not shown), are slidable leftward and rightward and are urged rightward by springs 113 and 114 respectively. While the shutter is in cocked state as seen in FIG. 8, the shutter blind 111 has its lug 111a engaged by a latch portion 124a of a shutter opening and closing initiating member 124 and is thereby retained in its cocked position, with its first blind portion 111A closing a shutter aperture 115. The shutter blind 111 further includes a second blind portion 111B positioned at the left of the first blind portion 111A and spaced therefrom by a distance. Formed between the two blind portions 111A and 111B is an opening 111C of a size sufficient to open out a shutter aperture 115.

The cocking blind 112 is normally pulled rightward by the spring 114 and is retained in position by a stopper 130. The blind 112 has an opening 112A having a size sufficient to fully open the shutter aperture 115 and positioned in front of the shutter aperture 115. The blind 112 further includes a blind portion 112B at the right of the opening 112A for closing the shutter aperture 115 during shutter cocking operation.

When a shutter button 110 is depressed while the shutter is in its cocked state as seen in FIG. 8, a first release member 120 supported by the camera body and biased upward by a spring 126 moves down and closes a power source switch 122 which has been open with its movable contact member 122a pushed up by a pin 120a to energize an electromagnet 121 as already described.

Between the stepped portion 120b of the first release member 120 and the driven portion 118a of a second release member 118, there is provided a space S while the shutter is in its cocked state, such that after the power source switch 122 has been closed during the depression of the shutter button 110, the stepped portion 120b of the first release member 120 comes into contact with the driven portion 118a of the second release member 118 and turns the member 118 in a counterclockwise direction.

A second release member 118, pivoted to a pin 117 and urged by a spring 119 in a clockwise direction, carries the aforementioned electromagnet 121 pivoted thereto by a pin 121a. When the shutter is in cocked state, the member 118 mechanically presses the attracting surface of the magnet 121 against an attraction piece 128 pivoted by a pin 127 to the shutter opening and closing initiating member 124.

Since the electromagnet 121 is energized upon closing of the power source switch 122 to hold the attraction piece 128 attracted, the aforementioned counterclockwise turning of the second release member 118 by the depression of the shutter button 110 moves the electromagnet 121 downward and turns the shutter opening and closing initiating member 124 in a counterclockwise direction through the attraction piece 128.

The shutter opening and closing initiating member 124 is pivoted by a pin 123 in the form of a balance and urged by a spring 125 in a clockwise direction, with its latch end 124a in engagement with the lug 111a of the shutter blind 111 as already described to latch the blind 111 in its cocked position. This engagement determines the position of the member 124 when it is cocked.

The counterclockwise turning of the shutter opening and closing member 124 against the action of the spring 125 frees the shutter blind 111 from engagement with the latch portion 124a, with the result that the blind 111 travels rapidly under the action of the spring 113 and fully opens the shutter aperture 115 with its opening 111C. Although the turning of the shutter opening and closing member 124 releases the shutter blind 111 from the latch portion 124a to free the same from its cocked position, a hooked latch portion 124b at the other end of the member 124 is brought into the path of rightward travel of another lug 111b of the shutter blind 111 by the counterclockwise turning of the member 124. Consequently, the rightward travel of the shutter blind 111 is temporarily stopped by the engagement of the lug 111b with the latch end 124b. The opening 111C of the shutter blind 111 is so positioned that the shutter aperture 115 will be fully opened when the shutter blind is brought to the stopped position.

The initiation of the rightward travel of the shutter blind 111 opens a count switch 129 which has been closed with its movable contact member 129a pushed by a projection 111d on the blind 111, bringing an exposure time control electric circuit into counting action. The parts are thus brought from the positions shown in FIG. 8 to the positions of FIG. 9.

Upon lapse of time counted by the exposure time control electric circuit, the electromagnet 121 is deenergized, so that the shutter opening and closing initiating member 124 turns, along with the attraction piece 128, in a clockwise direction under the action of the spring 125 to release the lug 111b of the shutter blind 111 from the latch end 124b. Accordingly, the shutter blind 111 travels further rightward under the action of the spring 113 to close the shutter aperture 115 with its second blind portion 111B and to thereby close the shutter. The blind 111 strikes against a projection 112a on the cocking blind 112 and stops. In this way the parts shift from the positions of FIG. 9 to the positions of FIG. 10.

When the depressing force is removed from the shutter button 110, the spring 126 acting on the first release member 120 pushes up the button along with the member 120, causing the pin 120a on the member 120 to open the power source switch 122.

The second release member 118 further turns clockwise under the action of the spring 119 acting thereon, following the upward movement of the first release member 120 to shift the electromagnet 121 upward. However, under this condition, the shutter opening and closing initiating member 124 has turned to the position shown in FIG. 10 where it is prevented from its clockwise turning by the lug 111a on the shutter blind 111, with the attraction piece 128 shifted to a considerably upper position, so that the attracting surface of the electromagnet 121 is still out of contact with the attraction piece 128 and the space S is not formed between the stepped portion 120b of the first release member 120 and the driven portion 118a of the second release member 118.

When the shutter is cocked, a cocking member 131 is brought into engagement with a projection 112b on the cocking blind 112 by unillustrated coupling means and moves leftward to push the blind 112. The projection 112a of the blind 112 causes the shutter blind 111 to travel with the blind 112.

Inasmuch as the cocking blind 112 and shutter blind 111 are positioned in such relation that the opening 11C of one blind is closed by the blind portion 112B of the other blind, with the opening 112A of the latter closed by the blind portion 111B of the former, the openings 112A and 111C will not open the shutter when passing leftward in front of the shutter aperture 115.

The shutter blind 111, which travels leftward with its lug 111a in sliding contact with the upper edge of the shutter opening and closing initiating member 124, turns the member 124 in a counterclockwise direction as the blind 111 advances leftward, bringing the attraction piece 128 into pressing contact with the attracting surface of the electromagnet 121 which has already shifted to an upper position to push the electromagnet 121 downward and to thereby turn the second release member 118 slightly counterclockwise.

At the almost final stage of cocking operation, the lug 111a of the shutter blind 111 passes over the latch end 124a of the member 124 and, at the same time, the projection 111d closes the count switch 129. When the blind 111 reaches the cocked position, the member 124 turns slightly clockwise under the action of the spring 125 to brings its latch end 124a into engagement with the lug 111a of the shutter blind 111. Thus the member 124 is cocked in position.

The second release member 118 follows the movement of the member 124, pushing up the electromagnet 121 with the attracting surface thereof in pressing contact with the attraction piece 128. At the same time, the specified space S is formed between the driven portion 118a and the stepped portion 120b of the first release member 120. The parts are now in positions illustrated in FIG. 11.

After overcocking, the cocking member 131 moves rightward, permitting the cocking blind 112 to follow the cocking member 131 under the action of the spring 114. The cocking blind 112 is stopped by the stopper 130, with its opening 112A positioned in front of the shutter aperture 115. However, the shutter will not be opened since the shutter aperture 115 is closed by the first blind portion 111A of the shutter blind 111. The parts are now in positions shown in FIG. 8.

Figure 11:
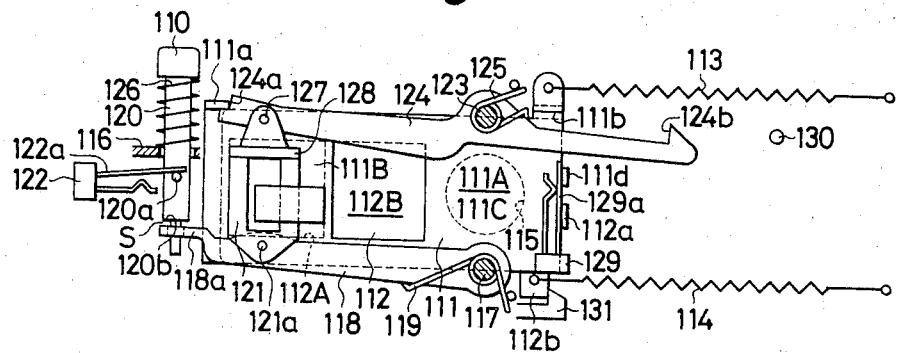
FIG. 11 shows the same to illustrate shutter cocking operation.
Figure 12:
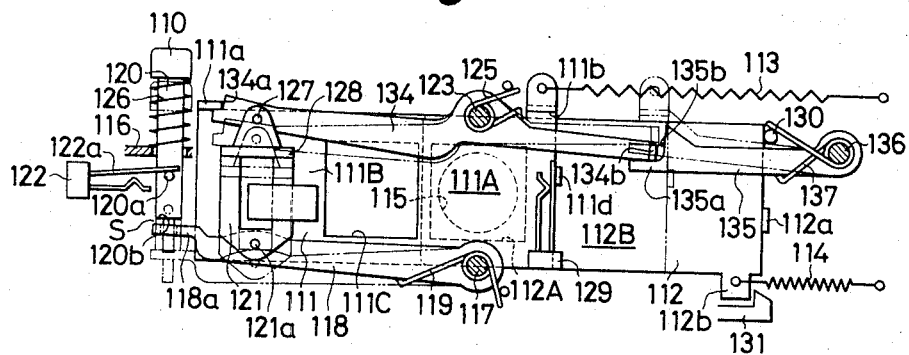
FIG. 12 is a front view showing a modification of the embodiment of FIG. 8.

FIG. 12 shows a modification of the embodiment of FIGS. 8 to 11 in which the shutter opening and closing initiating member 124 is replaced by two members, i.e., by a shutter opening initiating member 134 and a shutter closing initiating member 135.

The shutter opening initiating member 134, pivoted to the pin 123 in the form of a balance and urged by the spring 125 clockwise, has a latch end 134a in engagement with the lug 111a of the shutter blind 111 to retain the blind 111 in its cocked position.

The shutter closing initiating member 135 is pivoted at its base portion to a pin 136 and is urged by a spring 137 in a clockwise direction and has a distal end 135a in engagement with the under portion of a lug 134b at the other end of the opening initiating member 134 so as to be movable with the member 134. The member 135 further has a latch portion 135b engageable with the lug 111b of the shutter blind 111 to retain the blind 111 at the position where the shutter is fully open. The spring 137 acting on the shutter closing initiating member 135 is weaker than the spring 125 acting on the shutter opening initiating member 134. In FIG. 12, the same parts as in FIGS. 8 to 11 are referred to by the same numerals.

If the shutter in FIG. 12 is tripped, the power source switch 122 is closed and the shutter opening initiating member 134 is thereafter turned in a counterclockwise direction as indicated in the phantom line in the drawing through the first and second release members 120, 118, electromagnet 121 and attraction piece 128, whereby the shutter blind 111 in its cocked position is released from the latch end 134a and at the same time the lug 134b at the other end 134b is moved upward. Following this movement, the shutter closing initiating member 135 turns in a clockwise direction and strikes against the stopper 130, with its latch portion 135b brought into the path of advance of the lug 111b on the shutter blind 111 when the blind travels rightward.

The shutter blind 111 disengaged from the opening initiating member 134 travels rightward rapidly under the action of the spring 113 and fully opens the shutter with its opening 111C, whereupon the lug 111b comes into engagement with the latch portion 135b of the shutter closing initiating member 135 and stops.

Deenergization of the electromagnet 121 upon lapse of time counted by the exposure time control electric circuit permits the spring 125 to force the shutter opening initiating member 134 in a clockwise direction, causing the lug 134b at the other end of member 134 to depress the distal end 135a of the shutter closing initiating member 135 and to thereby turn the member 135 in a counterclockwise direction against the action of the spring 137. The member 135 therefore disengages the latch portion 135b from the lug 111b of the shutter blind 111, whereupon the shutter blind 111 travels rightward under the action of the spring 113 to close the shutter aperture 115 with the blind portion 111B for completion of an exposure.

As is the case with FIG. 11, the shutter is cocked by the cocking member 131, which causes the lug 111a on the shutter blind 111 to pass over the latch portion 134a of the shutter opening initiating member 134 into engagement with the latch portion 134a, whereby the shutter blind 111 is cocked in position.

During the operations described, the same parts as in FIGS. 8 to 11 operate in the same manner as therein illustrated.

The member of actuating the shutter into opening and closing action in the present embodiment is composed of the two member, namely the shutter opening initiating member 134 and shutter closing initiating member 135 for the following reason.

According to the embodiment shown in FIGS. 8 to 11 wherein the shutter opening and closing initiating member 124, pivoted to the pin 123 in the manner of a balance, is formed with latch portions 124a and 124b at its opposite ends respectively, the lug 111b will exert a great force on the latch portion 124b of the member 124 upon striking thereagainst with the acting spring force and inertia, when the shutter blind 111 is latched at the position where the shutter is fully opened after the blind has been brought into rapid travel to open the shutter.

If the above-mentioned force has a line of action that does not pass the center of turning movement of the member 124, the force will produce at its point of application a component acting to turn the member 124 about its pin 123 in a direction. The embodiment shown in FIGS. 8 to 11 is free of such objection since the line of action of the force is horizontal, but if the pin 123 is positioned below the line of action, the above-mentioned component would give the member 124 a clockwise moment which would produce a direct influence on the attracting force of the electromagnet 121 attracting the attraction piece 128 when acting on the latch portion 124b as an imactive force in opposition to the attracting force. To assure attraction, therefore, it becomes necessary to use an electromagnet giving a strong attracting force, hence disadvantageous. Accordingly, it is most preferable to position the pin 123 on the line of action, but this entails the drawback of reducing the freedom of design in respect of the position of the pin 123.

According to the embodiment of FIG. 12, these problems have been overcome by providing the latch portion 135b for retaining the shutter blind at the full-open position in the separate shutter closing initiating member 135 operatively associated with the shutter opening initiating member 134. Further if the pin 136 of the shutter closing initiating member 135 is positioned below the line of action of the force which acts on the latch portion 135b of the member 135 upon shutter opening action, the moment of the force at its point of application will act to turn the member 135 clockwise and will consequently act to further press the attraction piece 128 against the electromagnet 121.

Figure 13:
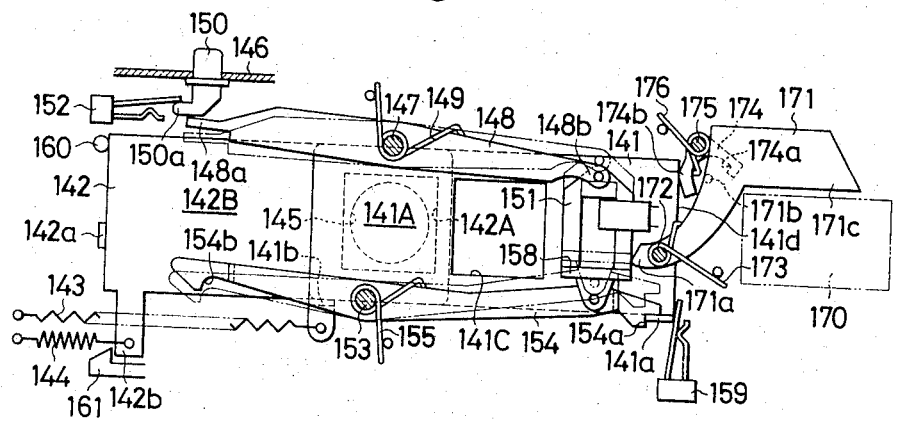
FIG. 13 is a front view showing another embodiment of this invention.
Figure 14:
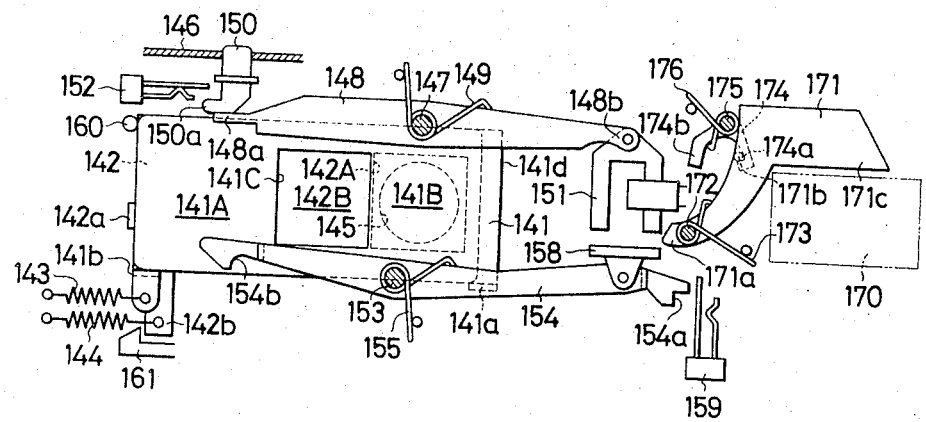
FIG. 14 shows the same when the shutter operated normally.
Figure 15:
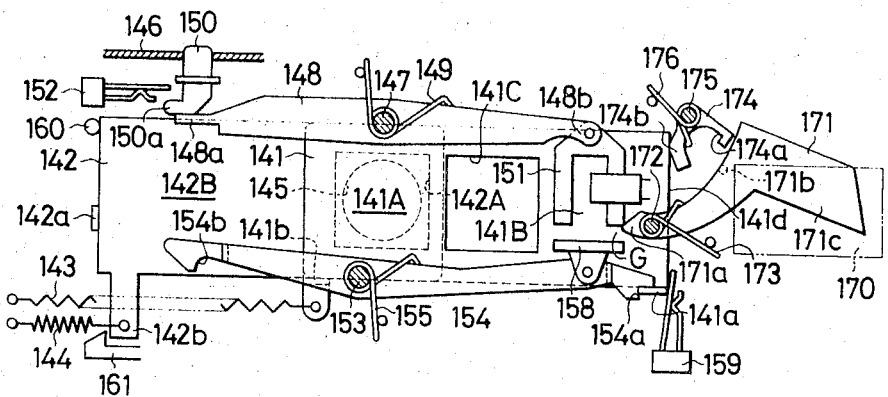
FIG. 15 shows the same when the shutter failed to operate normally.

FIGS. 13 to 15 show an embodiment wherein the operative connection between the shutter release member and the shutter opening and closing initiating member through the electromagnet and attraction piece is utilized to give an indication in the event that the power source battery for energizing the electromagnet has been drained and is incapable of permitting the electromagnet to give a normal magnetic force, the indication being provided upon tripping the shutter within the finder field being viewed by the photographer to notify that the shutter is inoperative and the battery must be replaced by a new one.

The embodiment includes an indicating member 171 pivotally supported on a pin 172 and urged by a spring 173 in a clockwise direction so as to be positionable within a finder field 170, and a latch member 174 pivoted to a pin 175 and biased clockwise by a spring 176 such that normal operation of the shutter will permit the latch member to retain the indicating member 171 outside the finder field 170.

While the shutter is in cocked state, the indicating member 171 keeps a detecting portion 171a at its rear end in contact with the side surface of an electromagnet 151, with its indicating portion 171c positioned outside the finder field 170 against the spring 173. When the electromagnet 151 is brought upward holding an attraction piece 158 attracted thereto by shutter tripping action, the detecting portion 171a comes into sliding contact with the side surface of the attraction piece 158 out of contact with the side surface of the electromagnet 151 to detect that the shutter operates normally. The indicating portion 171c is therefore retained outside the finder field 170. On the other hand, if the electromagnet 151 only moves upward upon tripping the shutter, producing a gap G between the magnet and the attraction piece 158, the indicating member 171 turns in a clockwise direction under the action of the spring 173 to bring the detecting portion 171a into the gap G, permitting the indicating portion 171c to position within the finder field 170.

The latch member 174 has a hooked portion 174a engageable with and disengageable from a pin 171b on the indicating member 171 and an arm 174b adapted for contact with the end edge 141d of a shutter blind 141. While the shutter blind 141 is in its cocked position, the end edge 141d pushes the arm 174b to keep the hooked portion 174a retracted from the path of advance of the pin 171b when the indicating member 171 turns clockwise. The initiation of leftward travel of the shutter blind 141 removes the pressure from the latch member, whereupon the spring 176 turns the latch member 174 clockwise to bring the hooked portion 174a into engagement with the pin 171b. This prevents the indicating member 171 from clockwise turning.

The shutter of the foregoing construction in its cocked state is indicated in the solid line in FIG. 13. With reference to FIG. 13, a shutter button 150 projects upward from a camera body 146 by being biased with an unillustrated spring. When depressed, the shutter button 150 closes a power source switch 152, whose movable contact member has been in engagement with the arm 150a of the shutter button 150, to energize the electromagnet 151.

Further depression of the shutter button 150 pushes down the driven end 148a of a release member 148 pivoted to a pin 147 and biased clockwise by a spring 149 and thereby turns the member 148 in a counterclockwise direction as indicated in the phantom line in the drawing, whereby the electromagnet 151 pivoted to the other end 148b is raised.

If the power source battery has a sufficient voltage to energize the electromagnet 151, the electromagnet has already been energized upon closing of the power source switch 152 to hold the attraction piece 158 attracted thereto, so that by virtue of the upward movement of the electromagnet 151 the detecting portion 171a of the indicating member 171 shifts from the side face of the electromagnet 151 into sliding contact with the side surface of the attraction piece 158, thus detecting that the electromagnet 151 is in normal operation and causing the indicating portion 171c to be retained outside the finder field 170.

The upward movement of the electromagnet 151 turns a shutter opening and closing initiating member 154 clockwise which member pivotally carries the attraction piece 158 at its one end and is pivoted to a pin 153 like a balance, the member 154 further being urged by a spring 155 in a clockwise direction. This movement frees the shutter blind 141 which has been retained in its cocked position by the engagement of a lug 141a with a latch portion 154a at one end of the member 154.

The shutter blind 141 in its cocked position keeps a shutter opening 145 closed by its first blind portion 141A, with its end edge 141d pushing the latch member 174 to hold the hooked portion 174a retracted from the path of advance of the pin 171b on the indicating member 171, the lug 141a closing a count switch 159. When freed from its cocked position as described above, the shutter blind 141 is brought into rapid leftward travel by the action of a spring 143, whereby the pressure is removed from the latch member 174 and from the movable contact member of the count switch 159. The spring 176 therefore turns the latch member 174 in a clockwise direction to bring the hooked portion 174a into engagement with the pin 171b on the indicating member 171. The count switch 159 opens to initiate the exposure time control electric circuit into counting action.

The foregoing turning of the shutter opening and closing initiating member 154 brings a latch portion 154b at the other end thereof into the path of advance of a lug 141b during the leftward travel of the shutter blind 141. At the position where the shutter blind 141 fully opens the shutter aperture 145 with its opening 141C, the lug 141b comes into engagement with the latch portion 154b, which in turn stops the leftward travel of the shutter blind 141.

Upon lapse of time counted by the electric circuit, the electromagnet 151 is deenergized, permitting the shutter opening and closing initiating member 154 to turn clockwise together with the attraction piece 158 under the action of the spring 155. The latch portion 154b releases the shutter blind 141 from the position where the shutter is fully opened.

Due to the foregoing operation, the attraction piece 158 moves downward out of contact with the electromagnet 151, so that the detecting portion 171a of the indicating member 171 which has been in contact with the side surface of the attraction piece 158 will be rendered positionable in the gap between the electromagnet 151 and the attraction piece 158 under the action of the spring 173. However, the indicating member 171 is held locked against clockwise movement by the engagement of the latch member 174 with the pin 171b and the indicating member 171c remains outside the finder field 170 (see FIG. 14).

The released shutter blind 141 travels further leftward under the action of the spring 143 and closes the shutter aperture 145 with its second blind portion 141B and is stopped by a projection 142a on the cocking blind 142 upon contact therewith to complete an exposure.

When the shutter button 150 is relieved of the depressing force, the button 150 and release member 148 return, opening the power source switch 152 and moving down the electromagnet 151.

The shutter is cocked by operating an unillustrated operation member to drive a cocking member 161 rightward. The cocking member 161 when moved rightward engages with a projection 142b on the cocking blind 142 and drives the blind 142 rightward.

Upon completion of exposure, the shutter blind 141 bears against the projection 142a on the cocking blind 142 as described above and closes an opening 142A with its second blind portion 141B. While tensioning the spring 143, the shutter blind 141 moves with the cocking blind 142 by being pushed by the projection 142a when the blind 142 is driven rightward. In the course of this cocking operation, the opening 142A of the cocking blind 142 is closed by the second blind portion 141B of the shutter blind 141 and the opening 141C of the shutter blind 141 is closed by the blind portion 142B of the cocking blind 142, without any possibility of the shutter aperture opening.

At the final stage of the cocking operation, the lug 141a on the shutter blind 141 comes into engagement with the latch end 154a of the shutter opening and closing initiating member 154 and closes the count switch 159. The blind 141 also pushes the arm 174b of the latch member 174 to turn the member 174 counterclockwise and to thereby disengage the hooked portion 174a from the pin 171b on the indicating member 171, whereas the indicating member 171 is prevented from clockwise turning by contact of the detecting portion 171a with the side surface of the lowered electromagnet 151. Further the aforementioned engagement of the shutter blind 141 with the shutter opening and closing initiating member 154 brings the attraction piece 158 into intimate contact with the attracting surface of the electromagnet 151.

The cocking member 161 moves rightward upon the cocking of the shutter blind 141 in position, followed by the rightward movement of the cocking blind 142 under the action of the spring 144. Upon completion of the cocking operation, the cocking blind 142 strikes against the stopper 160 and is thereby latched, with its opening 142A positioned in front of the shutter aperture 145. Thus the parts are returned to the positions indicated in the solid line in FIG. 13. The shutter aperture 145 is kept closed by the first blind portion 141A of the shutter blind 141.

When drained, the power source battery will fail to supply sufficient current to generate the desired magnetic force through the electromagnet 151, in spite of the depression of the shutter button 150 which closes the power source switch 152. Thus the magnetic force of the electromagnet 151 will be insufficient to hold the attraction piece 158 attracted thereto and to turn the shutter opening and closing initiating member 154 counterclockwise against the spring 155.

Consequently, although the release member 148 may be turned counterclockwise to bring the electromagnet 151 upward after the power source switch 152 has been closed, the attraction piece 158 fails to follow this movement, permitting the member 154 to hold the shutter blind 141 in its cocked position without effecting shutter opening and closing action.

If the shutter blind 141 remains latched at its cocked position, the latch member 174 has its arm 174b pushed with its hooked portion 174a kepted retracted from the path of advance of the pin 171b of the indicating member 171b.

On the other hand, the upward movement of the electromagnet 151 leaves the gap G between the magnet and the attraction piece 158, with the result that the detecting portion 171a of the indicating member 171 is brought out of contact with the sode surface of the electromagnet 151 to position in the gap G, the indicating member 171 thus turning in a clockwise direction under the action of the spring 173 to place its indicating portion 171c into the finder field 170 as seen in FIG. 15 and to thereby indicate that the shutter is inoperative due to drain of the power source battery.

Accordingly, if the pressure is removed from the shutter button 150, the button 150 and the release member 148 return under the spring force acting thereon, opening the power source switch 152 and moving down the electromagnet 151. The downwardly moving electromagnet 151 pushes the detecting portion 171a to turn the indicating member 171 in a counterclockwise direction and to remove the indicating portion 171c from the finder field 170. The attracting surface of the electromagnet 151 is pressed against the attraction piece 158, whereby the shutter is returned to the cocked state. The power source battery is then replaced by a new one to render the shutter ready for normal photographic operations.

Figure 16:
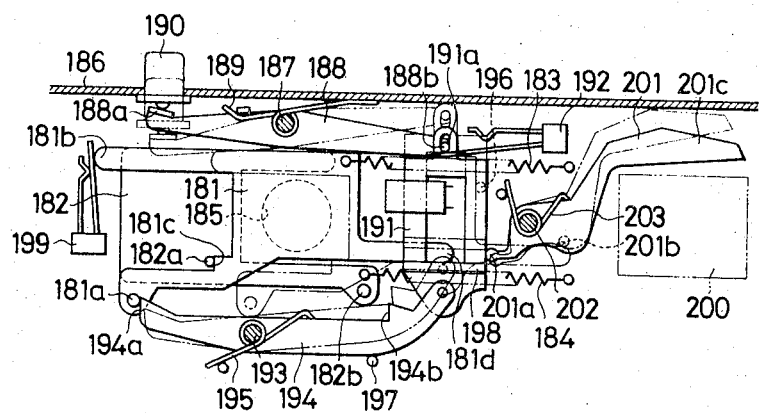
FIG. 16 is a front view showing another embodiment of this invention.
Figure 17:
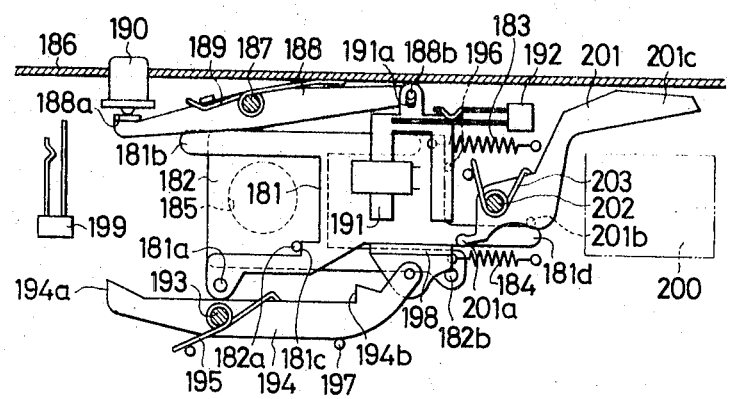
FIG. 17 shows the same when the shutter operated normally.
Figure 18:
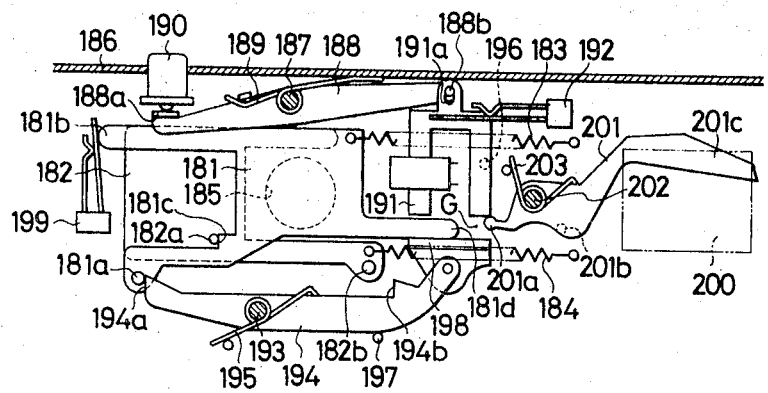
FIG. 18 shows the same when the shutter failed to operate normally.

FIGS. 16 to 18 show another embodiment of this invention wherein an indicating member 201 for indicating drain of the power source battery in a finder field 200 is utilized to absorb the inertia at the time when the shutter blind comes to a halt and to thereby prevent the blind from bouncing. According to this embodiment, it is possible to eliminate the latch member illustrated in FIGS. 13 to 15 for retaining an indicating member 201 outside the finder field 200 when the shutter is operable normally, so that the indicating mechanism can be simplified.

When the shutter is in cocked state as indicated in FIG. 16, a shutter button 190 is pushed up by a driven portion 188a at one end of a release member 188 and projects upward from a camera body 186. The release member 188, pivotally suported by a pin 187 like a balance and urged by a spring 189 in a clockwise direction, has at its one end a pin 188b engaged in a slot 191a of an electromagnet 191, the pin 188b urging the electromagnet 191 downward and pushing the movable contact member of power source switch 192 to leave the switch 192 open.

Depression of the shutter button 190 in this state turns the release member 188 in a counterclockwise direction. The pin 188b first closes the power source switch 192 in the course of its upward movement through the slot 191a. If the power source battery has a sufficient voltage, the electromagnet 191 is energized, whereby an attraction piece 198 in intimate contact with its attracting surface is held attracted thereto.

When the depression of the shutter button 190 brings the pin 188b to the upper end of the slot 191a, the counterclockwise turning of the release member 188 shifts the electromagnet 191 upward, causing the attraction piece 198 to move a shutter opening and closing initiating member 194 in a counterclockwise direction. Due to the aforementioned attraction, the electromagnet 191 and attraction piece 198 shift upward together, whereby the detecting portion 201a of the indicating member 201 in contact with the side surface of the electromagnet 191 comes into sliding contact with the side surface of the attraction piece 198.

The shutter opening and closing initiating member 194 is pivoted to a pin 193 in the manner of a balance and is urged by a spring 195 in a clockwise direction. When in cocked state, the member 194 has its latch end 194a engaged with a pin 181a on a first shutter blind to cock the blind 181 in position.

The first blind 181 has at its rear portion a projection 181b pushing the movable contact member of a count switch 199 to close the switch 199 when it is in cocked position. The blind 181 further has a stepped portion 181c in pushing contact with a pin 182a on a second shutter blind 182 to latch the blind 182 at its cocked position.

The counterclockwise turning of the shutter opening and closing initiating member 194 effected by tripping the shutter disengages the first blind 181 from its latch end 194a, bringing another latch portion 194b at the other end thereof into the path of advance of a pin 182b when the second blind 182 travels rightward.

The first blind 181 released from its cocked position starts to travel rightward rapidly under the action of a spring 183 and opens the switch 199 and unlatches the pin 182a on the second blind 182.

The second blind 182 thus unlatched tends to travel rightward under the action of a spring 184, but the other pin 182b comes into engagement with the latch portion 194b of the member 194, preventing the rightward travel.

The rightward travel of the first blind 181 opens a shutter aperture 185 to a full extent to make an exposure. At this time, the rapid travel of the first blind 181 may possibly cause the blind to bounce due to its own inertia when it is brought to a halt at the terminal point of its travel, with the result that the blind will cover part of the shutter aperture 185 again after it has been fully opened to adversely affect the exposure. Accordingly, the first blind 181 is generally adapted to be stopped at a position remote from the shutter aperture 185 so as to avoid the influence of the bouncing, but this lengthens the distance of travel of the shutter, making it difficult to provide a compact construction.

The present embodiment of this invention includes the aforementioned indicating member 201 pivoted to a pin 202 and urged clockwise by a spring 203 in a clockwise direction with its detecting portion 201a rendered slidable on the side face of the electromagnet 191 then onto the side face of the attraction piece 198, the indicating member further carrying a pin 201b positioned in the path of rightward movement of a projection 181d at the front side of the first blind 181 so as to come into contact with the projection 181d slightly before completion of the travel of the first blind 181.

Thus the first blind 181 brought into rapid rightward travel by the action of the spring 183 opens the shutter to a full extent, permitting the projection 181d to strike against the pin 201b at this moment to turn the indicating member 201 in a counterclockwise direction against the spring 203 and, at the same time, the blind completes its travel upon contact with a stopper 196. In this way, at the final stage of the rightward travel, the first blind 181 is braked by the action of spring 203 on the indicating member 201 and its inertia is thereby absorbed when the blind comes to a halt, hence there is no possibility of bouncing to take place. When the first blind 181 completes its travel, the indicating member 201 is turned slightly counterclockwise as indicated in the phantom line in FIG. 16, this movement mitigating the impact of stopping.

The electromagnet 191 is deenergized upon lapse of time counted by the exposure time control electric circuit, whereupon the shutter opening and closing initiating member 194 turns in a clockwise direction under the action of the spring 195, freeing the second blind 182 from engagement with the latch portion 194b and causing the spring 184 to travel the second blind 182 rightward rapidly to close the shutter aperture 185. The pin 182b comes into contact with the stepped portion 181c of the first blind 181 to complete the rightward travel, namely to complete an exposure.

The clockwise turning of the opening and closing initiating member 194 brings down the attraction piece 198 and produces a gap between the attraction piece 198 and the electromagnet 191. Consequently, the detecting portion 201a of the indicating member 20 which has been opposing the attraction piece 198 positions beside the gap. However, the projection 181d of the first blind 181 in engagement with the pin 201b on the indicating member 201 prevents the indicating member 201 from turning clockwise and thereby retains the indicating portion 201c of the member 201 outside the finder field 200 as seen in FIG. 17. Thus the projection 181d serves also as a latch member for retaining the indicating member 201 outside the finder field 200 when the shutter operates normally to simplify the latch construction.

If the depressing force is removed from the shutter button 190, the release member 188 pushes up the shutter button 190, opens the power source switch 192 and presses the attracting surface of the electromagnet 191 against the attraction piece 198 mechanically as in the embodiments already described.

In the same manner as in the foregoing embodiments, the shutter is cocked by driving the first blind 181 leftward by an unillustrated operation member. Upon completion of the cocking operation, the count switch is closed and the first blind 181 and second blind 182 are cocked in position.

The leftward movement of the first blind 181 disengages its projection 181d from the pin 201b on the indicating member 201. The spring 203 therefore turns the indicating member 201 slightly and brings the detecting portion 181a into contact with the side surface of the electromagnet 191 as indicated in the solid line in FIG. 16.

If the voltage of the power source battery is insufficient to energize the electromagnet 191, the electromagnet 191 fails to produce a sufficient magnetic force even if the shutter button 190 is depressed to turn the release member 188 counterclockwise and to close the power source switch 192. Accordingly, the attraction piece 198 can not follow the upward movement of the electromagnet 191 and the shutter opening and closing initiating member 194 remains cocked to prevent the travel of the first blind 181. In this state, there is formed a gap G between the electromagnet 191 and the attraction piece 198, so that the indicating member 201 with its detecting portion 201a in contact with the side surface of the electromagnet 191 when in cocked state turns clockwise under the action of the spring 203 to position the detecting portion 201a in the gap G and to place the indicating portion 201c into the finder field 200, indicating that the shutter is inoperative.

If the shutter button 190 is then relieved of the depressing force, the release member 188 turns in a clockwise direction as already described to move down the electromagnet 191. The detecting portion 201a is pushed to turn the indicating member 201 counter-clockwise and to thereby retract the indicating portion 201c from the finder field. Further the power source switch 192 is opened. Replacement of the power source battery by a new one will then permit normal photographic operations. Indicated at 197 is a stopper for the clockwise turning of the shutter opening and closing member 194.

Each of the foregoing embodiments is so designed that the power source switch must be held closed by depressing the shutter button until completion of exposure. If the power source switch is opened after shutter tripping action but before completion of the counting action of the exposure time control electric circuit, the electromagnet will be deenergized too early to result in an underexposure.

However, it is well-known that such trouble can be prevented for example by providing a self-sustaining circuit for the power source switch which is closed simultaneously with the depression of the shutter button. This eliminates the necessity to keep the shutter button depressed until the completion of exposure.

Furthermore, the electromagnet may of course be provided on the shutter opening and closing initiating member, while the attraction piece may be disposed on the release member.

The exposure time control electric circuit may be of a known type, so that description and illustration of the same will not be given.

What is claimed is:

1. An electronic shutter apparatus for a camera comprising:
   an electromagnet to be energized by closing a power source switch and to be deenergized under the control of an exposure time control electric circuit,
   an attraction piece to be held attracted to the attracting surface of the electromagnet while the electromagnet is energized,
   a release member for shifting the electromagnet and the attraction piece by shutter tripping action after the attraction piece has been attracted to the electromagnet by closing the power source switch for energizing the electromagnet, the release member supporting one of the electromagnet and the attraction piece and being biased in one direction to bring the electromagnet and the attraction piece mechanically into intimate contact with each other by the biasing force when the shutter is cocked in position, and
   a shutter opening and closing initiating member for initiating the shutter into opening and closing action, the initiating member supporting the other of the electromagnet and the attraction piece unsupported by the release member and being biased in a direction to move the electromagnet and the attraction piece away from each other, the initiating member being operable with the release member to initiate the shutter into opening action through the electromagnet and the attraction piece held attracted thereto when the electromagnet is energized, the initiating member being operable by the biasing force to initiate the shutter into closing action upon deenergization of the electromagnet.

2. The apparatus as set forth in claim 1 wherein the release member is operable upon tripping the shutter to close the power source switch and to thereafter shift the electromagnet.

3. The apparatus as set forth in claim 1 wherein after the power source switch is closed by tripping the shutter the release member is operable to shift the electromagnet.

4. The apparatus as set forth in claim 1 wherein the release member comprises a first release member operable by tripping the shutter to close the power switch and a second release member operable with the first release member after the power source switch is closed to shift the electromagnet.

5. The apparatus as set forth in claim 1 wherein the shutter opening and closing initiating member has a latch portion for latching a first shutter blind at its cocked position upon cocking the shutter and another latch portion positionable into the path of advance of a second shutter blind simultaneously when the first blind is unlatched to latch the second blind at the position where the shutter is fully opened.

6. The apparatus as set forth in claim 1 wherein the shutter opening and closing initiating member comprises a shutter opening initiating member for latching a shutter blind at its cocked position upon cocking the shutter, the shutter opening initiating member being operable with the release member when the electromagnet is energized to unlatch the shutter blind and to thereby initiate the shutter into opening action, and a shutter closing initiating member operable with the shutter opening initiating member to be positioned into the path of advance of the shutter blind upon the unlatching of the shutter blind to latch the shutter blind at the position where the shutter is fully opened, the shutter closing initiating member being operable to unlatch the shutter blind and to thereby initiate the shutter into closing action upon deenergization of the electromagnet.

7. The apparatus as set forth in claim 6 wherein the shutter closing initiating member is pivotally supported by a pin so disposed that a component of the force resulting from the latching of the shutter blind at its point of application will act in the direction to bring the electromagnet and the attraction piece into intimate contact with each other.

8. The apparatus as set forth in claim 1 further comprising indicating means for detecting whether the electromagnet is energized or unenergized to visually indicate in a finder field that the shutter is inoperative when the electromagnet is unenergized.

9. The apparatus as set forth in claim 8 wherein the indicating means includes an indicating member having a detecting portion to be positioned into a gap formed between the electromagnet and the attraction piece when the attraction piece is not attracted by the electromagnet upon tripping the shutter to place its indicating portion into the finder field, and a latch member operable by detecting shutter opening action to retain the indicating member outside the finder field.

10. The apparatus as set forth in claim 8 wherein the indicating means includes an indicating member so biased as to have its detecting portion positioned into a gap formed between the electromagnet and the attraction piece when the attraction piece is not attracted by the electromagnet upon tripping the shutter to place its indicating portion into the finder field and the indicating member comes into contact with a shutter blind at the almost final stage of travel of the shutter blind to brake the blind with the biasing force.

* * * * *